United States Patent Office 3,304,965
Patented Feb. 21, 1967

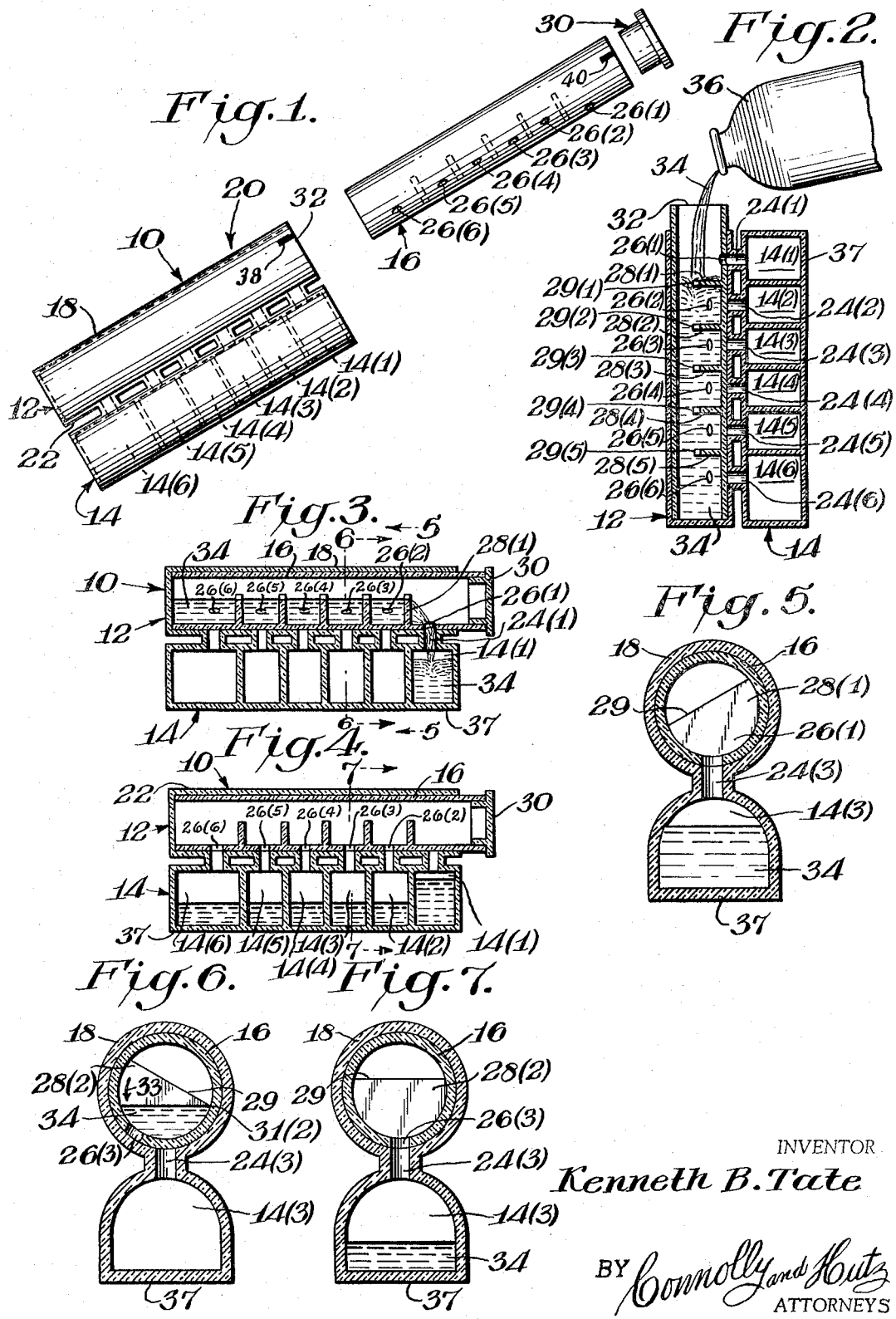

3,304,965
DEVICE FOR COLLECTING SEPARATE
QUANTITIES OF LIQUID
Kenneth B. Tate, Englewood, N.J., assignor to Chas.
Pfizer & Co., Inc., New York, N.Y., a corporation of
Delaware
Filed Feb. 5, 1964, Ser. No. 342,711
6 Claims. (Cl. 141—325)

This invention relates to a device for collecting separate small quantities of liquid in individual containers, and it more particularly relates to such a device for use in a laboratory.

In conducting various laboratory tests on liquids, it is necessary to obtain predetermined small quantities of the liquid which are then subjected to various physical tests or reagents. Such quantities are usually manually obtained and separately measured which is troublesome and time consuming.

An object of this invention is to provide a device for conveniently and rapidly collecting a number of predetermined small quantities of a liquid in separate containers.

Another object is to provide such a device for simultaneously collecting such quantities.

In accordance with this invention an elongated baffled dispensing chamber has an open end through which liquid can flow and a closed end. A series of open-end baffles extend inwardly within the dispensing chamber between a series of valves in its wall for segregating quantities of the liquid between the baffles when the dispensing chamber is filled with liquid in a substantially vertical position and the device is then disposed in a horizontal position with the open ends of the baffles up. The valves are then operated to cause the quantities of liquid between the baffles to flow out into collecting containers which may be external, such as a rack of test tubes, or a compartmented chamber attached to the dispensing chamber.

In an advantageous form of this invention a barrel is rotatably inserted within a cylindrical dispensing chamber, and the baffles are disposed within the barrel. The valve means between the dispensing chamber and the compartments are provided by longitudinally aligned ports in the barrel and the wall between the dispensing and collecting chambers. By rotating the barrel the ports are misaligned or aligned from each other to close or open them. The compartment disposed adjacent the filling end may be used as an overflow compartment, and the port in the barrel for the overflow compartment may be angularly staggered from the other valve ports to allow the overflowing liquid to drain into the overflow compartment while the segregated quantities remain trapped between the baffles.

When the device is turned from the vertical filling position into the horizontal position, a closure may be applied to the open end to divert the overflow liquid into the overflow compartment while the level slowly drops to that of the baffles at a slow enough rate to insure that baffled portion of the dispensing chamber is completely full. The entire device or only the barrel may be angularly rotated to various angles to proportionately lower the level within the baffled portion when it is desired to obtain less than the full quantities in each compartment. The portion of the wall of the compartmented chamber disposed remote from the open ends of the baffles may be made substantially flat to facilitate resting the device upon a surface in a horizontal position.

Novel features and advantages of the present invention will become apparent to one skilled in the art from a reading of the following description in conjunction with the accompanying drawing wherein similar reference characters refer to similar parts and in which:

FIG. 1 is an exploded view in elevation of one embodiment of this invention;

FIG. 2 is a cross-sectional view in elevation of the assembled device shown in FIG. 1 in the vertical filling position in conjunction with a filling container;

FIGS. 3 and 4 are cross-sectional views in elevation of the embodiment shown in FIG. 2 in the horizontal position in two different conditions of operation;

FIGS. 5 and 6 are cross-sectional views taken through FIG. 3 along respective lines; and FIG. 7 is a cross-sectional view taken through FIG. 4 along the line 7—7.

In FIG. 1 is shown a device 10 for collecting separate small quantities of a liquid, which is one embodiment of this invention. Collecting device 10 includes a baffled dispensing chamber 12 and a compartmented collecting chamber 14 disposed alongside each other. Dispensing chamber 12 includes for example cylindrical barrel 16 rotatably and snugly inserted within a cylindrical housing 18, that is part of the hollow body 20 shown in FIG. 1. Dispensing chamber 12 of device 10 therefore includes barrel 16 inserted within cylindrical housing and the later described valves.

An apertured wall 22 separates cylindrical dispensing chamber 12 from compartmented chamber 14 that includes separate compartments 14(1)–14(6). Inlet ports 24(1)–24(6) are disposed between each of compartments 14(1)–14(6) and cylindrical dispensing chamber 12. A series of valve ports 26(1)–26(6) in the wall of barrel 16 are longitudinally aligned with correspondingly numbered inlet ports to cooperate in providing a series of valves that control the flow from dispensing chamber 12. The snug fit of the barrel within the dispensing chamber substantially seals the valves provided by the valve and inlet ports when the valve ports are angularly misaligned with the inlet ports. The first valve port 26(1) is angularly staggered relative to the other valve ports for an overflow draining purpose later described.

A series of open-ended baffles 28 extend within barrel 16 preferably substantially perpendicularly to its longitudinal axis for segregating predetermined quantities of liquid above compartments 14 when the device is disposed in a horizontal position as later described in detail.

Closure 30 conveniently made in the form of a capped plug seals the open end 32 of dispensing chamber 12 by insertion within it to facilitate the operation of the device in the manner now described.

In FIG. 2 liquid 34 is being poured from bottle 36 through the open end 32 of dispensing chamber 12 when device 10 is in a substantially vertical position, and the valve means provided by ports 24(2)–24(6) and 26(2)–26(6) are angularly misaligned with each other to close them. Liquid 34 is therefore poured into dispensing chamber 12 until it covers upper baffle 28(1).

Capped plug 30 is then inserted within open end 32 of dispensing chamber 12 to seal it, and device 10 is then turned to the substantially horizontal position shown in FIG. 3 in which the lower flat surface 37 on the portion of collecting chamber 14 remote from dispensing chamber 12 and the open ends 29 of baffles 28 is resting flat upon a horizontal surface (not shown). Liquid 34 then overflows past the open ends 29 of baffles 28 into the portion of dispensing chamber 12 adjacent open end 32 and over compartment 14(1). Ports 26(1) and 24(1) can be aligned with each other and to open the valve means that they provide when the other valves are closed by angularly misaligning corresponding ports 26(2)–26(6) and 24(2)–24(6). This drains liquid overflowing over the open end 29 of baffle 28(1) into overflow compartment 14(1), but restricts its flow enough to insure that all of the baffled portions of dispensing chamber 12 are completely full. Spillage from the device is prevented by plug 30.

In FIG. 4 barrel 16 has been angularly rotated by turning plug 30 to align ports 26(2)–26(6) with corresponding inlet ports 24(2)–24(6) to thus dispense the quantities of fluid collected by baffles 28 into compartments 14(2)–14(6). If for any reason it is desired to collect less than the full amount of liquid between the baffles before dispensing, barrel 16 can be inclined by rotating barrel 16 to any position in which the valves are still closed or by angularly inclining the entire device 10 about the longitudinal axis of chamber 12. The lower edge of the baffles then defines the level of liquid confined therebetween. The quantities trapped above each compartment 14 within dispensing chamber 12 can also be regulated by varying the height of baffles 28.

This device is conveniently made of a transparent material such as glass or a suitable plastic such as polystyrene. Various reagents may be added directly to compartments 14 either before or after the quantities of liquid to be tested are dispensed into the compartments. Outlet valves can also be provided on compartments 14 for discharging the segregated quantities of liquids to other containers for either an initial or additional tests. Dispensing chamber 12 can also be separately utilized without collecting chamber 14 where the separate quantities are dispensed to separate containers such as a row of test tubes in a rack.

FIGS. 6 and 7 show the relative positions of the baffles and valve ports in the two illustrated phases of operation. In FIG. 6 valve port 26(3) is out of line with inlet port 24(3) of compartment 14(3) as are all of valve ports 26(2)–26(6) with corresponding inlet ports 24(2)–24(6). This traps liquid between baffles 28 while overflow or drain valve port 26(1) is aligned with inlet port 24(1) to cause liquid overflowing baffles 28 to drain into compartment 14(1) as shown in FIGS. 3 and 5.

FIG. 6 shows how the lower edge 31(2) of baffle 28(2) defines the height of liquid trapped behind it. In the illustrated form of this invention, it is necessary to rotate barrel 16 counterclockwise as shown in FIG. 6 by arrow 33 to align valve ports 26(2)–26(6) with corresponding inlet ports 24(2)–24(6) as shown in FIG. 7. This raises lower edge 31(2) and thus retains all of the trapped liquid behind baffle 28(2). Rotation in a direction to drop lower edge 31(2) would lose some of the trapped liquid before it could be drained into collecting compartments 14(2)–14(6). Rotational indicia or stops 38 and 40 (shown in FIG. 1) between the two positions shown in FIGS. 3–7 facilitate the trapping of uniform quantities of liquid between baffles 28. An elongated drain valve port 26(1) provides drainage into compartment 14(1) during most or all of the rotation of barrel 16.

What is claimed is:

1. A device for conveniently collecting separate small quantities of a liquid comprising an elongated dispensing chamber having a wall and open and closed ends, a series of open-ended baffles extending inwardly from said wall into said chamber to provide a series of segregating chambers, a valve means in said wall in each of said segregating chambers in the portion of said wall to which said baffles are connected remote from their open ends, operating means connected with said valve means for dispensing the quantities of liquid segregated in said segregating chambers after said device is filled by pouring liquid into its open end in a substantially vertical position and then turning it to a substantially horizontal position, said dispensing chamber comprising a cylindrical chamber having a cylindrical barrel rotatably inserted within, said baffles being disposed within said barrel, said valve means comprising longitudinally aligned ports in said barrel and said cylindrical chamber, said barrel being inserted snugly within said cylindrical chamber to provide a substantially liquid-tight seal with said cylindrical chamber, and said valve operating means comprising means for rotating said barrel within said cylindrical chamber.

2. A device as set forth in claim 1 wherein an overflow drain means is provided on the side of said baffle adjacent said open end whereby excess liquid flowing over said baffles in said horizontal position is drained.

3. A device as set forth in claim 1 wherein the valve ports in said barrel comprise an overflow port and outlet ports, said overflow port being angularly staggered from said other ports whereby said overflow liquid is caused to flow through said overflow port when said segregated quantities of liquid are retained between said baffles in said horizontal position.

4. A device as set forth in claim 3 wherein a closure is provided for said open end of said dispensing chamber for confining said overflow liquid between it and said baffle adjacent said open end.

5. A device as set forth in claim 1 wherein the portion of the wall of said dispensing chamber disposed remote from said open ends of said baffles is substantially flat to facilitate resting said device upon a surface when it is disposed in said horizontal position.

6. A device as set forth in claim 1 wherein an elongated compartmented collecting chamber is disposed alongside said dispensing chamber, said compartmented chamber having a series of separate compartments, and said valve means connecting each of said compartments with said dispensing chamber.

References Cited by the Examiner

UNITED STATES PATENTS

| 482,815 | 9/1892 | Steinmetz | 222—427 X |
|---|---|---|---|
| 1,466,862 | 9/1923 | Vanatter | 137—265 X |
| 2,740,571 | 4/1956 | Busto | 222—427 X |

FOREIGN PATENTS

| 262,108 | 7/1913 | Germany. |
|---|---|---|

LAVERNE D. GEIGER, *Primary Examiner.*

SAMUEL ROTHBERG, E. J. EARLS,
*Assistant Examiners.*